(No Model.)
F. MARQUARDT.
HOBBY HORSE.
No. 468,572. Patented Feb. 9, 1892.
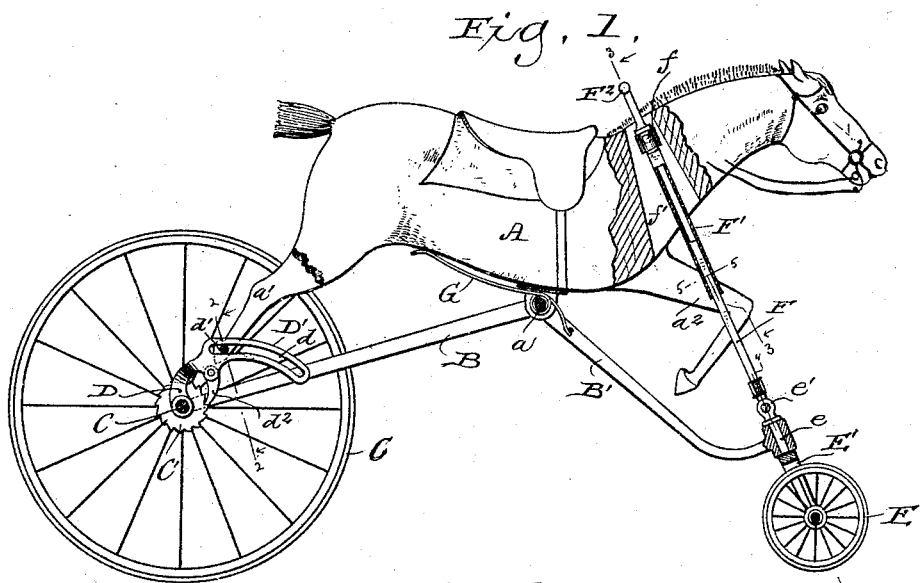
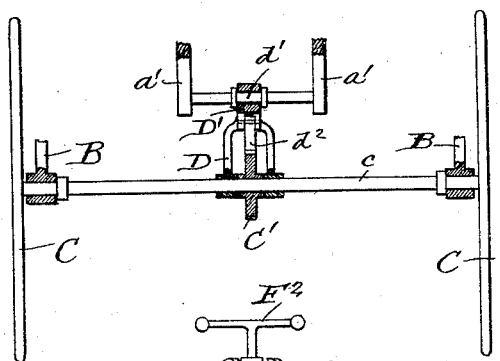
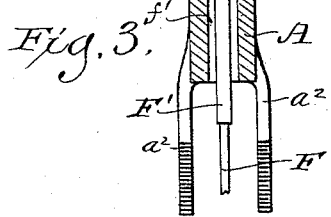
Witnesses
Geo. W. Young
John E. Hiles
Inventor
Fred Marquardt
By H. G. Underwood
Attorney

UNITED STATES PATENT OFFICE.

FRED MARQUARDT, OF MILWAUKEE, WISCONSIN.

HOBBY-HORSE.

SPECIFICATION forming part of Letters Patent No. 468,572, dated February 9, 1892.

Application filed September 24, 1891. Serial No. 406,737. (No model.)

*To all whom it may concern:*

Be it known that I, FRED MARQUARDT, a citizen of the United States, and a resident of Milwaukee, in the county of Milwaukee, and in the State of Wisconsin, have invented certain new and useful Improvements in Hobby-Horses; and I do hereby declare that the following is a full, clear, and exact description thereof.

My invention relates to certain new and useful improvements in hobby-horses, and relates more particularly to a device of this class in which the device in representation of the body of a horse or other animate object is mounted upon wheels, and means are provided for propelling the same by a movement of said body.

The invention consists in the matters hereinafter described, and pointed out in the appended claims.

In the accompanying drawings, illustrating my invention, Figure 1 is a side elevation of a device embodying my invention, showing parts broken away. Fig. 2 is a sectional view taken on line 2 2 of Fig. 1. Fig. 3 is a sectional view on line 3 3 of Fig. 1. Fig. 4 is a detail sectional view taken on line 4 4 of Fig. 1. Fig. 5 is a detail sectional view on line 5 5 of Fig. 1.

In said drawings, A represents the body portion made in representation of a horse or other animate object pivotally supported upon a suitable frame, as at $a$, and provided with legs $a'$ $a'$ and $a^2$ $a^2$. The supporting-frame is composed of arms B B and B' B', extending, respectively, toward the rear and the front of the device, the rearwardly-extending arms being engaged with the axle $c$, upon which the two rear wheels C C are secured, and the forwardly-extending arms being provided with suitable means for engaging the front or steering wheel. A ratchet-wheel C' is located upon the axle $c$ and a bifurcated arm D is revolubly engaged with said axle and arranged with its furcations upon opposite sides of the ratchet-wheel C', as shown more particularly in Fig. 2, and a curved arm D' is provided upon said bifurcated arm, said curved arm being provided with a slot $d$, and a transverse rod $d'$ is secured between the lower portions of the rear legs of the body portion and engaged with said slot $d$. A spring-actuated pawl $d^2$ is provided upon the arm D and arranged to engage with the teeth of the ratchet-wheel C'. The forward ends of the arms B' B' are engaged with a hub $b$, and the front wheel E is journaled between the arms of a bifurcated frame-piece E', which is provided at its upper end with a spindle $e$, arranged to bear in the hub $b$. A squared or angular rod F is flexibly engaged, as at $e'$, with the upper end of the spindle $e$ and extends upwardly through a tubular section F', which is in turn pivotally connected with the body portion of the device, as at $f$, being secured within a pivoted hanger, while being revoluble therein. A steering-handle F² is provided upon the upper end of the tubular section of the rod, by means of which said rod may be rotated so as to turn the wheel E to steer the vehicle in the desired direction.

As illustrated in Figs. 1 and 3 of the drawings, the body portion of the device is provided with an elongated opening $f'$, within which the upper portion of the steering-bar is permitted to vibrate. A spring G is preferably arranged beneath the body portion in such manner as to return said body portion to a substantially horizontal position.

The operation of my improved device is as follows: The rider, seated upon the saddle, by throwing his weight forward causes the body A to oscillate about the pivotal support $a$, thus elevating the hind legs $a'$ $a'$, and thereby rotating the arm D upon the rear axle $c$ and lifting the pawl $d^2$, so as to cause the same to engage the ratchet-wheel C' at a point above the level of the axle $e$, the two-parted steering-rod being by its telescopic arrangement before described permitted to adjust itself to the position of said body portion. Then by a reverse movement of his body, the rider throwing his weight backward, depresses the rear portion of the body A, the legs $a'$ $a'$ being thereby moved downward. By the engagement of said legs $a'$ $a'$, as before described, with the slotted arm D' the downward movement of said legs will obviously operate to vibrate said arm about the axle $c$, thereby serving by the engagement of the pawl $d^2$ to revolve the said axle, and with it the rear wheels C C. This oscillating movement of the body A being continued will obviously serve to communicate a continuous rotary motion to the wheels C C. The rider may readily guide the device in any desired direction by turning the steering-handle F² in the manner before described.

Having thus described my invention, what I claim as new, and desire to secure by Letters Patent of the United States, is—

1. The combination, with a suitable frame having driving and steering wheels, of a body pivotally supported upon said frame, a ratchet-wheel upon the axle of said driving-wheels, a slotted arm pivotally connected with said axle and carrying a pawl adapted to engage with said ratchet-wheel, and a movable connection between said body and said slotted arm, substantially as described.

2. The combination, with a suitable frame having driving-wheels and a steering-wheel, of a body pivotally supported upon said frame, a rod composed of two sections telescoped together and engaged at one end with said steering-wheel and at the other pivotally supported in said body, a ratchet on the axle of said driving-wheels, a slotted arm carrying a pawl and revolubly engaged with said axle, and a movable connection between said body and said slotted arm, substantially as described.

3. The combination, with a suitable frame carrying driving-wheels and a steering-wheel, of a body pivotally supported upon said frame, a spring for returning said body to its normal position, a steering-rod composed of two sections telescoped together and operatively engaged at the lower end with said steering-wheel and at the upper end revolubly engaged within a pivoted hanger, a ratchet-wheel on the axle of the driving-wheels, a slotted arm carrying a pawl and revolubly engaged with said axle, and a movable connection between said body and said slotted arm, substantially as described.

In testimony that I claim the foregoing I have hereunto set my hand, at Milwaukee, in the county of Milwaukee and State of Wisconsin, in the presence of two witnesses.

FRED MARQUARDT.

Witnesses:
JOHN E. WILES,
N. E. OLIPHANT.